Patented Nov. 13, 1945

2,388,844

UNITED STATES PATENT OFFICE 2,388,844

ESTERS OF ALPHA-ETHACRYLIC ACID

Rudolph Leonard Hasche and William P. Utermohlen, Jr., Kingsport, Tenn., assignors to Eastman Kodak Company, Rochester, N. Y., a corporation of New Jersey No Drawing. Application January 7, 1943,
Serial No. 471,608

4 Claims. (Cl. 260—486)

This invention relates to esters of α-ethacrylic acid and to a process for preparing them.

Esters of α-methacrylic acid are well known. They have been prepared by dehydrating esters of α-hydroxy acids and by dehydrohalogenating esters of α-halogeno acids. The methyl ester of α-methacrylic acid can also be prepared by direct esterification of α-methacrylic acid with methyl alcohol. On the other hand, the preparation of the higher esters of α-methacrylic acid by direct esterification with higher alcohols has been fraught with difficulties owing, among other things, to polymerization. For this reason, a number of the higher esters of α-methacrylic acid have been prepared from the methyl ester by an ester interchange process wherein the methyl ester is treated with a higher alcohol.

We have now found that unlike esters of α-methacrylic acid, esters of α-ethacrylic acid of all kinds can be prepared by direct esterification of α-ethacrylic acid with an alcohol. By this method, we have been able to provide a number of esters of α-ethacrylic acid which were unknown prior to our invention. Only the methyl and ethyl esters of α-ethacrylic acid were known heretofore and these were prepared by dehydration of methyl and ethyl α-hydroxy isovalerates.

It is accordingly, an object of our invention to provide new esters of α-ethacrylic acid. A further object is to provide a process for preparing such esters. Other objects will become apparent hereinafter.

In accordance with the invention, we prepared esters of α-ethacrylic acid by esterification of the acid with an alcohol. The esterification is advantageously effected in the presence of an esterification catalyst, such as an acid esterification catalyst, e. g. sulfuric acid, a sulfonic acid, etc.

According to one embodiment of our invention, we heat α-ethacrylic acid with an excess of an alcohol, in the presence of an acid esterification catalyst. At least, about 2 molecular proportions (e. g. from about 2 to about 4 molecular proportions) of alcohol for each molecular proportion of acid are advantageously employed. The water which is formed during the esterification in this embodiment is retained in the reaction mixture. This embodiment is especially useful for the preparation of n-propyl, isopropyl and allyl α-ethacrylates.

According to a further embodiment of our invention, we heat α-ethacrylic acid with an excess of an alcohol in the presence of an acid esterification catalyst. The excess alcohol and water formed during the esterification are removed as an azeotrope leaving the ester. The water layer may be removed from the condensed distillate, and the alcohol layer returned to the reaction mixture, preferably in a continuous fashion. At least about 2 molecular proportions (e. g. from about 2 to about 4 molecular proportions) of alcohol for each molecular proportion of acid are advantageously employed. This embodiment is especially useful for the preparation of n-primary butyl, n-primary amyl and isoamyl α-ethacrylates.

According to still another embodiment of our invention, we heat α-ethacrylic acid with an equivalent amount of an alcohol in the presence of an acid esterification catalyst and a water immiscible organic liquid entraining agent, such as benzene, toluene, or xylene, for example. The water immiscible liquid and water formed during esterification are removed as an azeotrope leaving the ester. The water layer may in this case also be removed from the condensed distillate, and the layer of organic entrainer liquid returned to the reaction mixture, preferably in a continuous fashion. This method is especially useful for the preparation of esters of α-ethacrylic acid not mentioned above, particularly those formed from alcohols of high boiling point (above 140° C.)

The following examples will serve to illustrate our new esters and the manner of obtaining the same:

*Example 1.—Allyl α-ethacrylate*

100 g. (1 mol.) of α-ethacrylic acid, 120 g. (2.08 mol.) of allyl alcohol and 1 cc. of concentrated sulfuric acid were mixed together. The mixture was refluxed under a reflux condenser for 16 hours. At the end of this time the mixture was distilled at atmospheric pressure until only unreacted α-ethacrylic acid and catalyst remained in the still. The ester layer of the distillate was washed with a small amount of a 20 percent aqueous solution of sodium bisulfite, in order to remove color, then with a slight excess of a dilute solution of sodium bicarbonate, and finally with water until the liquid being washed was neutral. The washed liquid was then distilled in vacuo and 96 g. (69 percent yield) of water-white, clear allyl α-ethacrylate boiling at 79° to 80° C. at 50 mm. of mercury pressure were obtained.

*Example 2.—Isoamyl α-ethacrylate*

200 g. (2 mol.) of α-ethacrylic acid, 230 g. (2.6 mol.) of isoamyl alcohol and 1 g. p-toluene sulfonic acid were mixed together. The mixture was refluxed under a reflux condenser in a fashion such as to permit the distillation and removal of water entrained by the isoamyl alcohol, the apparatus being equipped with a water trap, and to permit the continuous return of the alcohol layer of the distillate to the reaction mixture. Refluxing was continued until no more water separated in the distillate. At the end of this time the reaction mixture was cooled and was washed with a 20 percent aqueous solution of sodium bisulfite in order to remove color, then with a dilute sodium biscarbonate solution, and finally with water until the liquid being washed was neutral. The washed liquid was then distilled in vacuo. 278 g. (81 percent yield) of isoamyl α-ethacrylate were obtained as a water-white, clear liquid with a pleasant odor and boiling at 90° to 91° C. at 20 mm. of mercury pressure.

*Example 3.—2-ethyl-n-primary butyl α-ethacrylate*

125 g. (1.25 mol.) of α-ethacrylic acid, 135 g. (1.3 mol.) of 2-ethyl-n-primary butanol, 60 cc. of toluene and 1 g. of p-toluene sulfonic acid were mixed together. The mixture was refluxed under a reflux condenser in a fashion such as to permit distillation and removal of water entrained by the toluene, the apparatus being equipped with a water trap, and to permit the continuous return of the organic liquid layer of the distillate to the reaction mixture. Refluxing was continued until no more water separated in the distillate. At the end of this time the reaction mixture was cooled and was washed with a 20 percent aqueous solution of sodium bisulfite in order to remove color, then with a slight excess of a dilute aqueous solution of sodium bicarbonate, and finally with water until the liquid being washed was neutral. The washed liquid was then distilled in vacuo. After the removal of water and toluene in the forerun, 204 g. (89 percent yield) of 2-ethyl-n-primary butyl α-ethacrylate were obtained as a clear, water-white liquid boiling at 77° C. at 1.5 mm. of mercury pressure.

*Example 4.—Ethylene glycol di-α-ethacrylate*

62 g. (1 mol.) of ethylene glycol, 200 g. (2 mol.) of α-ethacrylic acid and 1 ml. of concentrated sulfuric acid were mixed together. Toluene (75 ml.) was added to the mixture as an entraining agent for water formed during the esterification. The mixture was heated so that the entraining agent and water distilled off, the entraining agent being continuously returned to the reaction mixture. Heating was continued until water no longer separated in the distillate. The reaction mixture was cooled, washed successively with dilute sodium bisulfite and sodium bicarbonate solutions, and finally washed with water until neutral. The organic liquid layer was separated from the aqueous layer and then distilled in vacuo. A 50–60 percent yield of ethylene glycol di-α-ethacrylate was obtained as a water-white limpid liquid with a pleasant odor which boiled at 106° C. at 1.5 mm. of mercury pressure.

*Example 5.—Diethylene glycol di-α-ethacrylate*

106 g. (1 mol.) of diethylene glycol and 200 g. (2 mol.) of α-ethacrylic acid were mixed with a 0.5 ml. of sulfuric acid and 60 m. of toluene. As in the preceding example, the mixture was heated until no more water separated in the distillate. The ester mixture was cooled, washed successively with dilute sodium bisulfite and sodium bicarbonate solutions, and finally washed with water until neutral. The washed ester was distilled in vacuo and an 80 percent yield of diethylene glycol di-α-ethacrylate, boiling at 130° C. at 1.5 mm. of mercury pressure, was obtained.

*Example 6.—Triethylene glycol di-α-ethacrylate*

150 g. (1 mol.) of triethylene glycol and 200 g. of α-ethacrylic acid were esterified as in the preceding example using 75 ml. of toluene as the water entraining agent and about 2 g. of p-toluene sulfonic acid as catalyst. After the reaction had proceeded to completion as evidenced by the fact that water no longer separated in the distillate, the reaction mixture was cooled, washed successively with dilute sodium bisulfite and sodium bicarbonate solutions, and was finally washed with water until neutral. The ester layer was separated and distilled in vacuo. An 80 percent yield of triethylene glycol di-α-ethacrylate, boiling at 173° C. at 1.5 mm. of mercury pressure, was obtained.

*Example 7.—Glycerol tri-α-ethacrylate*

92 g. of glycerol and 300 g. of α-ethacrylic acid were esterified under reflux with 120 ml. of toluene as the water entraining agent and with 1 ml. of concentrated sulfuric acid as catalyst. After esterification was complete, as indicated by the fact that water no longer separated in the distillate, the reaction mixture was cooled, and washed with dilute sodium bisulfite solution. The ester was extracted with diethyl ether, and the ether solution was washed with a slight excess of dilute sodium bicarbonate solution, and then with water until neutral. The ether was removed at normal pressure, and the residue was fractionated in vacuo. The glycerol tri-α-ethacrylate was obtained as a slightly viscous liquid with a pleasant odor, boiling at 113° C. at 0.15 mm. of mercury pressure.

*Example 8.—Propylene glycol di-α-ethacrylate*

80 g. (1.05 mol.) of propylene glycol, 200 g. (2 mol.) of α-ethacrylic acid, and 75 ml. of toluene were heated under reflux with 1 g. of p-toluene sulfonic acid as catalyst. The water produced in the reaction was withdrawn as the toluene azeotrope, returning the toluene layer of the distillate to the reaction mixture. Reaction was continued until the water no longer separated in the distillate. The reaction mixture was then worked up as described in Examples 4, 5 and 6. The ester layer was then distilled in vacuo and obtained as a colorless liquid boiling at 122° C. at 1.5 mm. of mercury pressure.

*Example 9.—β-(n-primary butoxy) ethyl-α-ethacrylate*

240 g. (2.03 mol.) of β-n-primary butoxy ethanol ("butyl cellosolve"), 200 g. of α-ethacrylic acid, 75 ml. of toluene, and 1 ml. of concentrated sulfuric acid as catalyst were heated together under reflux, as in earlier examples, until water no longer separated in the distillate. The organic liquid layer of the distillate was continuously returned to the reaction mixture. The reaction mixture was then worked up by a procedure similar to that described in Example 3 above. The washed neutral ester-toluene mixture was fractionated in vacuo; the ester was obtained as a colorless liquid boiling at 91° C. at 1.5 mm. of mercury pressure, in 84 percent yield.

β-benzyloxy ethyl α-ethacrylate and the various "carbitol" α-ethacrylates (esters of α-ethacrylic acid with diethylene glycol mono-alkyl ethers) can be prepared in a similar fashion. So, also, can β-methoxy-ethyl and β-ethoxy-ethyl α-ethacrylates be similarly produced, except that for best results an excess of the corresponding alcohol must be used. This is advisable because part of these alkoxy alcohols distills out of the reaction mixture, and enters the water layer when the distillate condenses and separates. These alcohols do not separate out from the toluene when water is absent, hence in these cases, as in the ones described above, the end of the esterification reaction is indicated by the disappearance of the second liquid phase in the distillate.

The following table contains the boiling points of a representative group of esters of α-ethacrylic acid which we have prepared by our new process.

| Alcohol employed | B. P., °C. of ester | Pressure (mm. of Hg) |
|---|---|---|
| n-Propyl | 53 | 2 |
| Isopropyl | 69 | 50 |
| n-Primary butyl | 64–65 | 5 |
| Isobutyl | 74 | 21 |
| Secondary butyl | 64–66 | 19 |
| Tertiary butyl | 89–90 | 19 |
| n-Primary amyl | 68 | 1.5 |
| Isoamyl | 90–91 | 20 |
| Diethyl carbinol | 80–82 | 19 |
| 2-ethyl-n-primary hexyl | 92 | 1.5 |
| n-Primary hexyl | 85–86 | 1.5 |
| 2-ethyl-n-primarybutyl | 77 | 1.5 |
| Methyl isobutyl | 66 | 1.5 |
| Allyl | 79–80 | 50 |
| Ethyl "Carbitol" | 101–102 | 1.5 |
| n-Primarybutyl "Carbitol" | 113–115 | 1.5 |
| β-Benzoxyethyl | 128 | 1.5 |
| β-Phenoxyethyl | 130 | 1.5 |
| β-Ethoxyethyl | 72 | 15 |
| β-Methoxyethyl | 93 | 26 |
| β-(n-Primarybutoxy)-ethyl | 130 | 26 |
| Benzyl | 103 | 1.5 |
| 2-nitro-1-butanol | 104 | 1.5 |
| β-Diethylaminoethyl | 88–90 | 1.5 |
| Ethylene glycol | 106 | 1.5 |
| Diethylene glycol | 130 | 1.5 |
| Triethylene glycol | 173 | 1.5 |
| Glycerol | 113 | 1.5 |
| Propylene glycol | 122 | 1.5 |

We have found that the majority of the esters of monohydric alcohols and α-ethacrylic acid do not undergo homopolymerization to give solid polymers. In this respect these esters differ very markedly from the corresponding esters of α-methacrylic acid. However, we have also found that allyl α-ethacrylate differs from the other esters of monohydric alcohols in that it undergoes homopolymerization when heated in the presence of a polymerization catalyst such as an organic peroxide, e. g. benzoyl peroxide, to give a clear, hard, bubble-free infusible resin. This is surprising not only because the other esters of α-ethacrylic acid and monohydric alcohols do not polymerize, but also because a very large part of the known allyl compounds fail to undergo homopolymerization to yield resinous homopolymers.

The esters of α-ethacrylic acid and polyhydric alcohols are quite different from the esters of monohydric alcohols in that the esters of the polyhydric alcohols undergo homopolymerization to yield clear, hard, bubble-free infusible resinous polymers.

The following examples will serve to illustrate the resinous homopolymers that can be prepared from some of our new esters:

*Example 10.—Polymer of allyl α-ethacrylate*

100 g. of allyl α-ethacrylate were mixed with 0.5 g. of benzoyl peroxide. The mixture was heated at 60° C. for 14 days. A hard, water-white clear polymer, free from bubbles, was formed at the end of this time, resembling the polymer of diethylene glycol di-α-ethacrylate (Example 11 below).

*Example 11.—Polymer of ethylene glycol di-α-ethacrylate*

100 g. of ethylene glycol di-α-ethacrylate were mixed with 1.0 g. of benzoyl peroxide. The mixture was heated at 60° C. for about 48 hours. A hard, sparkling, transparent, water-white solid was obtained which was free from bubbles and other imperfections.

*Example 12.—Polymer of diethylene glycol di-α-ethacrylate*

100 g. of diethylene glycol di-α-ethacrylate were mixed with 1.0 g. of benzoyl peroxide. The mixture was heated at 60° C. for about 72 hours. As in the preceding case, the polymer was a crystal clear, water-white product free from bubbles. The polymer had a density of 1.2.

*Example 13.—Polymer of triethylene glycol di-α-ethacrylate*

100 g. of triethylene glycol di-α-ethacrylate were mixed with 0.5 g. of benzoyl peroxide and the mixture heated at 60° C. for 96 hours. The resulting polymer possessed a sparkling transparency, was water-white and free from bubbles.

*Example 14.—Polymer of glycerol tri-α-ethacrylate*

100 g. of glycerol tri-α-ethacrylate was mixed with 0.25 g. of benzoyl peroxide. The mixture was heated at 60° C. for about 72 hours. A clear water-white, hard, transparent polymer which was free from bubbles was obtained. The polymer had a density of approximately 1.2.

*Example 15.—Polymer of propylene glycol di-α-ethacrylate*

100 g. of propylene glycol di-α-ethacrylate were mixed with 1 g. of benzoyl peroxide. The mixture was heated at 60° C. for about 72 hours, the completion of polymerization being evidenced by freedom from all odor. A clear, transparent, water-white solid polymer was obtained, having a density of approximately 1.2.

The esters of α-ethacrylic acid which do not undergo polymerization are useful in certain cases for the preparation of copolymers with other vinyl compounds. For example, many of the esters of α-ethacrylic acid which do not undergo homopolymerization can be co-polymerized with α-ethacrylic acid to give resinous products with desirable properties. As an illustration, when α-ethacrylic acid and β-methoxyethyl α-ethacrylate were copolymerized a clear, hard homogeneous solid was formed which could be molded to give a clear, sparkling resin plate. The other β-alkoxy-ethyl α-ethacrylates copolymerized with α-ethacrylic acid to give similar results. When α-ethacrylic acid was polymerized by itself (with same catalyst and temperature, the polymer separated out from the monomer, and was of no value.

The following example will serve to illustrate the preparation of copolymers of β-alkoxyethyl-α-ethacrylates and α-ethacrylic acid.

*Example 16.—Copolymer of β-ethoxyethyl-α-ethacrylate and α-ethacrylic acid*

Equal parts by weight of beta-ethoxyethyl-alpha-ethacrylate and alpha-ethacrylic acid were mixed, 1% by weight of benzoyl peroxide was added, and the whole was stored at 60° C. for 160 hours. The entire mixture had copolymerized to give a slightly yellow, clear, hard solid. The polymeric material was molded to give a clear, hard, somewhat brittle plate. The same monomeric ingredients, in the same proportions as above, together with 10% or less dibutyl phthalate, also copolymerized to give a clear, hard and somewhat brittle, solid resin.

What we claim as our invention and desire to be secured by Letters Patent of the United States is:

1. An alkoxyalkyl α-ethacrylate.
2. β-methoxyethyl α-ethacrylate.
3. β-ethoxyethyl-α-ethacrylate.
4. β-(n-primary butoxy)-ethyl-α-ethacrylate.

RUDOLPH LEONARD HASCHE.
WILLIAM P. UTERMOHLEN, Jr.